Jan. 1, 1924. 1,479,650
J. CLARK
PIPE COUPLING
Filed April 13, 1921
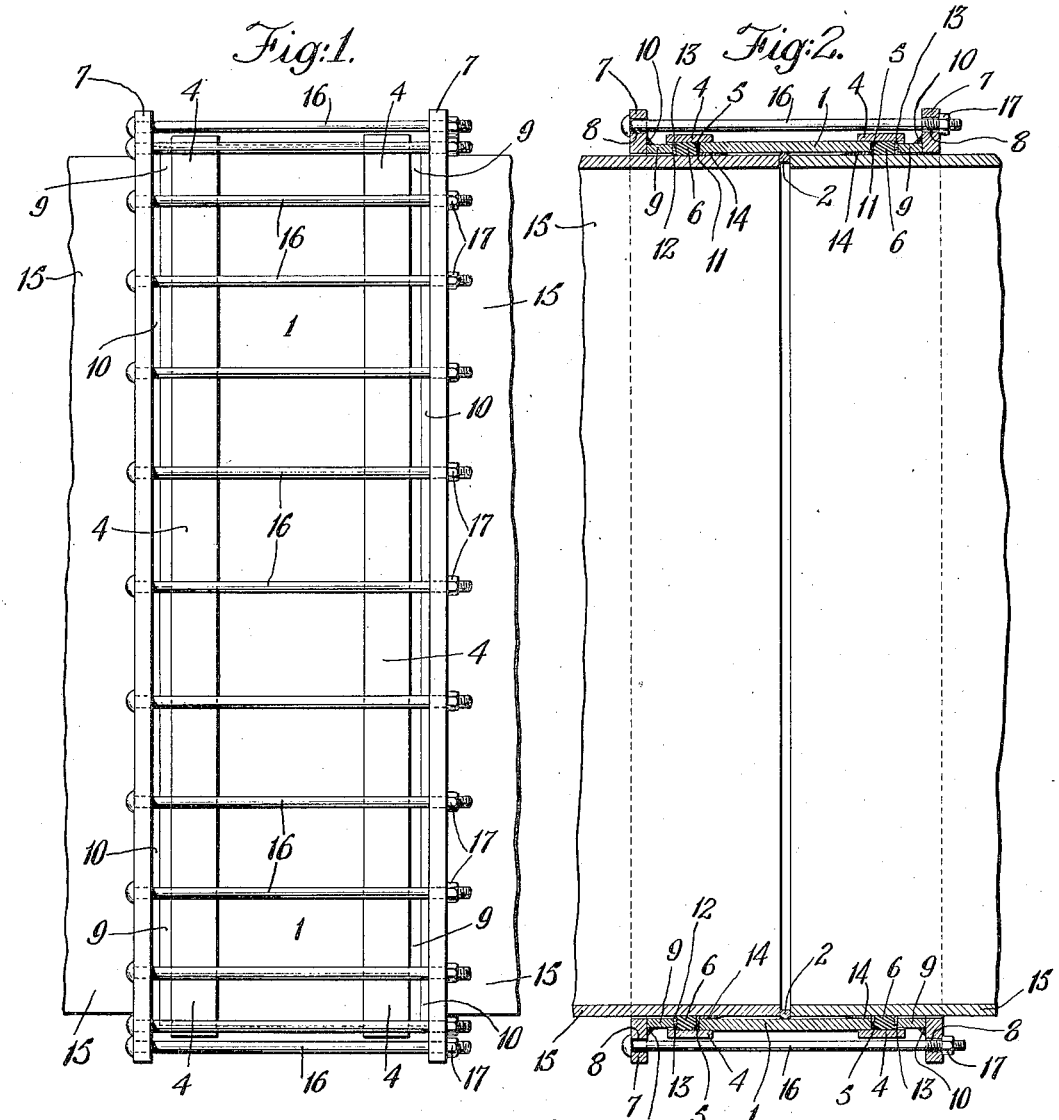
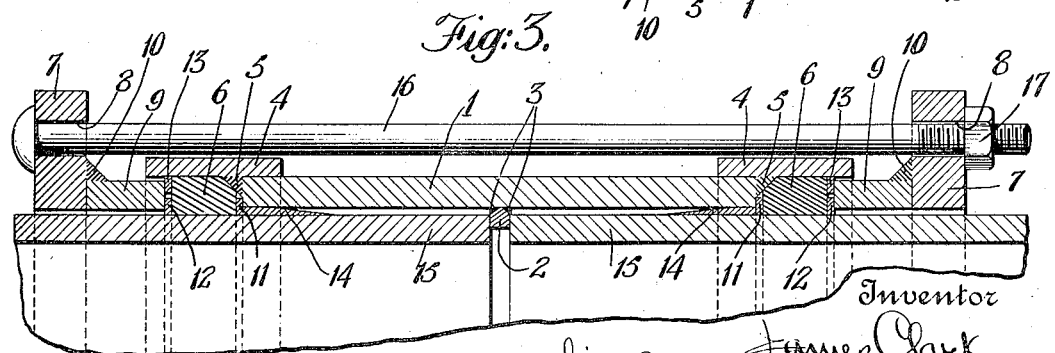

Patented Jan. 1, 1924.

1,479,650

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

PIPE COUPLING.

Application filed April 13, 1921. Serial No. 461,036.

*To all whom it may concern:*

Be it known that I, JAMES CLARK, a citizen of the United States, residing at Bradford, in the county of McKean and State of Pennsylvania, have invented certain new and useful Improvements in Pipe Couplings; and I do hereby declare the following to be a full, clear, and exact description of the invention, such as will enable others skilled in the art to which it appertains to make and use the same.

My invention consists in the novel features hereinafter described, reference being had to the accompanying drawing which illustrates one embodiment of the invention selected by me for purposes of illustration, and the said invention is fully disclosed in the following description and claims.

The object of my invention is to provide a coupling of the type known as the Dresser pipe coupling for effecting a tight joint between the meeting ends of what are known as "plain end" pipe sections, that is to say, pipe sections the meeting ends of which are not provided with screw threads, flanges or other integral means for uniting the same. The coupling herein described is designed particularly for connecting the ends of pipes of large diameter with thick walls as for example, pipes having an integral diameter of from three to eight feet, or even larger, and from one half inch to two inches in thickness, for use in pipe lines or otherwise. It is important in couplings of this kind that the individual pipe sections may be permitted to have a certain amount of movement with respect to the couplings to accommodate the contraction and expansion of the pipes while preserving a tight joint at all times at every point of connection. These pipe sections are ordinarily manufactured in comparatively short lengths, about twenty feet, (although they may be of other lengths) so that a very large number of these joints occur in every mile of the pipe line and any leakage in the joints would result in loss of large quantities of fluid which, in the case of a valuable fluid such as oil or natural gas results in great loss of valuable material as well as danger of explosion or fire, while in the case of water the leakage would result in inefficiency of the pipe line and injury thereto by the undermining of the soil on which it rests. In manufacturing pipes of these large diameters, such as pipes from three to eight feet in diameter, for example, the pipe sections are formed by bending a sheet of metal into the form of a cylinder and welding the meeting edges. The sheet metal will ordinarily have a thickness between a half inch and two inches, and there will necessarily be a certain amount of variation in the interior and exterior surfaces of the pipe from true circles, which must be taken into account in constructing pipe couplings to be applied indiscriminately to the pipe sections as they are assembled in the field or other location and united in a pipe line. While the coupling which forms the subject matter of this invention has been designed particularly to meet this situation and the particular coupling illustrated has been especially designed to connect pipe sections having an internal diameter of eight feet, I wish it to be understood that the features of the invention herein set forth may be applied to couplings for pipes of lesser diameters, and lesser thickness than the examples mentioned.

Referring to the accompanying drawings,

Fig. 1 is an elevation of one embodiment of my improved pipe coupling.

Fig. 2 is a sectional view of the same.

Fig. 3 is an enlarged sectional view through one side of the coupling and the adjacent pipe sections.

My improved pipe coupling comprises the following members, to wit:—a middle ring adapted to enclose the meeting ends of two adjacent pipe sections having plain or unthreaded ends, said middle ring being provided with portions of larger diameter at each end to form packing recesses and being preferably provided at its interior with a centering stop for centering the middle ring over the joint, annular packing located in the packing recesses and adapted to be compressed against the middle ring and the exterior of the pipe sections, a pair of clamping rings each having an annular flange portion provided with bolt apertures and a follower or sleeve portion adapted to extend into one of the packing recesses, and the connecting bolts extending from one clamping ring to the other for drawing the rings toward each other and compressing the packings.

In the manufacture of the middle ring in such large diameter it is preferably formed of separate parts which are formed separately and united preferably by welding. The middle ring comprises essentially the following members. 1 represents a main or central sleeve which is preferably formed by bending a sheet of metal (steel or wrought iron) into cylindrical form and welding the ends together. The interior of the sleeve 1 is provided centrally of its length with a centering stop or stops 2 preferably formed by applying to the interior of the sleeve an annular ring or separate curved segmental pieces, in either case having the curved face adjacent to the inner surface of the sleeve 1 beveled in opposite directions to form recesses triangular in cross section. In these recesses triangular filets, indicated at 3, are inserted and welded, preferably electrically, so as to unite the ring 2 (or segment as the case may be) to the sleeve 1, as clearly shown in the drawing in Figs. 2 and 3. The centering stop may be a continuous ring extending entirely around the interior of the sleeve, or it may be a series of separate segmental stops, as may be preferred or found most convenient, in either case the centering stop acts to engage the meeting ends of the pipe sections and prevent them from being inserted too far within the sleeve, and this centering stop enables the workmen constructing the pipe line to so place the sleeve over the meeting ends of the pipe sections that it will extend equally over each. At each end of the sleeve 1 is an end sleeve, indicated at 4, having its internal diameter substantially the same as the external diameter of the sleeve 1. These end sleeves overlap portions of the sleeve 1 and extend beyond the ends of the sleeve 1 to form annular packing recesses as shown. The end sleeves are united to the sleeve 1 and are preferably so united as to become integral parts of the middle ring. I prefer to unite the end sleeves to the sleeve 1 in the following manner. Annular filets, indicated at 5—5, triangular in cross section, of metal are placed against the ends of the sleeve 1 and the adjacent interior faces of the sleeves 4 and are welded, preferably by electrical welding, to the sleeves 1 and 4, thereby uniting the sleeves 1 and 4, as an integral structure. The outer faces of the filets 5 are inclined to the axis of the sleeves and form part of the inner ends of the packing recesses and extend in an inclined direction outwardly from the pipe sections toward the outer ends of the middle ring so that when the packings are compressed, as hereinafter described, the inclined faces of these filets at the inner ends of the packing recesses, produce a compression of the packings by a wedging action, between the middle ring and the exterior of the enclosed portions of the pipe sections, and assist in producing a perfectly tight joint.

6—6 represent annular packings or packing rings which are preferably of rubber, but which may be of other materials, such as lead, asbestos, or various compositions including rubber and fibrous material. These packing rings are preferably formed in the cross section indicated in the drawings, that is to say, they have cylindrical inner faces adapted to engage the pipe, short cylindrical outer faces to engage the inner faces of the end sleeves 4 of the middle ring, an annular beveled portion for engaging the filet 5, and lateral faces perpendicular to the axis of the ring, so that these packing rings fit the packing recesses formed within the end sleeves 4 and filets 5, the end of the central sleeve 1, and the adjacent exterior surface of the enclosed pipe section.

In order to compress the packings I employ a pair of clamping rings, each of which preferably comprises an annular flange portion 7 disposed perpendicularly to the axis of the ring and is preferably formed by bending a strip or bar of metal edgewise into circular form and welding the ends together, or by the said flange portion 7 being provided with a plurality of bolt holes 8 distributed around the ring at suitable intervals according to the size of the coupling and the pressure which it must be prepared to sustain within the pipe line. Each clamping ring also comprises a cylindrical follower section, indicated at 9, which is in fact a ring or sleeve formed by bending a piece of metal into cylindrical form and welding the ends together, the inner diameter of the follower 9 being substantially the same as the inner diameter of the flange 7 and both being slightly greater than the exterior diameter of the pipe. The follower section 9 and flange section 7 of the clamping ring are united preferably by a filet 10 triangular in cross section, which is placed around the follower portion 9 and against the adjacent inner face of the flange 7 and welded to both parts, preferably by electrical welding, so as to unite them in an integral structure. It will be understood that in making the parts of the coupling of such large diameters, especially, it is necessary to have the clearance between the adjacent parts sufficient to accommodate variations from a true circle which will be found in bent and welded articles, especially in those of such huge dimensions. For the purpose of insuring the proper compression of the packing rings 6 within the packing recesses and preventing the exuding of portions of the packing rings into the clearance between the follower 9 and the exterior of the pipe and interior of the end sleeve 4, I provide split rings which are interposed between the ends of the follower portion 9 and the packing and at the inner end of the packing recess, which rings can be made of lighter stock and will preferably be split in an inclined direction with respect to the radius of the ring, so that these rings can be readily placed in position and made to fit the pipe section or the interior of the packing recess much more closely than the other parts of the coupling and prevent the exuding of the packing rings, thus retaining the entire body thereof within the packing recess and subject to the compression. In the present instance I have shown one of these split rings, indicated at 11, at the inner end of each packing recess, where it abuts the inner end of the sleeve 1 within the circle of the filet 5, a similar ring 12 being located against the outer face of the packing ring, the rings 11 and 12 having an internal diameter substantially the same as the external diameter of the pipe. 13 represents another split ring which has its external diameter substantially identical with the internal diameter of the end sleeves 4 and its inner diameter slightly greater than the external diameter of the split ring 12, so that when placed in position it will tend to fit against the inner face of the end sleeve 4 and these rings 13 are placed against the exterior perpendicular face of the packing rings 6. There are therefore provided the two split rings 12 and 13 between the packing 6 and the inner face of the follower section 9 of the clamping ring, as is clearly shown in Fig. 3, so that any space between the rings 12 and 13 is closed by the follower portion 9.

For the purpose of centering the middle ring around the meeting pipe ends and facilitating the insertion of the packing and clamping rings, and the coupling together of the parts, I prefer to provide wedges 14, indicated in the drawings, which are inserted between the end portions of the central sleeve 1 and the exterior of the pipe sections at intervals around the latter so as to provide substantially uniform clearance between the sleeve 1 and the pipe sections all the way around. These wedges may be of any desired width and any desired number of the same may be employed.

In assembling and applying the coupling the meeting ends of the pipe sections, indicated at 15—15, have applied to each of them a clamping ring and a packing ring before the ends of the pipe are brought together. The middle ring is then placed in engagement with one pipe section so as to bring the end of the pipe adjacent to the centering stop 2, and the other pipe section is then inserted in the other end of the middle ring and brought into juxta-position to the centering stop 2. The wedges 14 are then inserted between the middle ring and the pipe sections so as to provide substantially uniform clearance all the way around, and the inner split rings 11 are placed around the pipe sections at the inner end of the packing recess to cover the clearance space and close the inner ends of the packing recess. The packing rings 6 are then moved endwise along the pipe sections into the packing recesses and the exterior split rings 12 and 13 are fitted against the outside faces of the packings after which the clamping rings are brought up into position so that the inner ends of the follower portions 9 thereof will engage the exterior split rings 12 and 13. The bolts, indicated at 16, are then passed through the bolt holes 8 of the clamping rings and the nuts 17 are applied thereto and drawn up, thereby forcing the follower portions of the clamping rings against the split rings 12 and 13 and compressing the packings 6 in the packing recesses and forcing the packings against the exterior of the pipe sections and the interior of the end sleeves 4. As this compression takes place the inclined faces of the filets 5 which connect the central sleeve 1 of the middle ring with the end sleeves 4 will assist in wedging the packing and in the compression of the same.

This coupling will produce an absolutely tight joint at all times and at the same time will permit the pipe sections to move endwise with respect to the coupling and the adjacent pipe section, as may be necessary to accommodate the expansion and contraction of the pipe sections due to variations in temperature. It will also be noted that sufficient clearance is provided between the inner surface of the middle ring and the ends of the pipe sections to permit the pipes to be connected in slightly angular relation where this may be desirable in laying a line over a hill or through a valley, or in a more or less curved direction, which may be necessitated by the general course of the pipe line. In laying a line of pipe the changes in direction within the length of adjacent pipe sections is comparatively slight and is amply taken care of by the clearance provided and indicated herein.

While, as before stated the coupling herein shown and described has been designed especially for use in connection with pipes having an internal diameter of eight feet, it is to be understood that the inventive features herein disclosed and covered by the following claims may be employed in couplings for pipes of any desired diameter as may be found advantageous or desirable.

While I have described the rings 11, 12 and 13 which confine the packings as split rings, it is to be understood that I might use solid rings which are not split and which could be put on the ends of the pipes on opposite sides of the packing previous to the assembly of the parts of the coupling. I prefer, however, to make these rings in the form of split rings and to cut them angularly with respect to a radius thereof, as before described, so that the ends will overlap as it somewhat facilitates the placing of these rings in position and also enables me to fit them closer to the respective surfaces of the pipe or sleeve where they are needed to prevent the escape of the packing from the packing recess.

The filets referred to herein, and which are ordinarily of triangular cross section as shown in the drawings, are preferably formed by fusing of the welding rod in electrical welding apparatus, in a well known manner, but they may be formed and welded or otherwise secured in position in other ways if desired and found convenient.

While I have described the flange members of the clamping rings as being preferably formed by bending a bar edgewise into ring form and welding the ends together, it is to be understood that it may be so bent and the ends connected by an over-lapping bridge piece riveted in opposite sides of the joint, on the outer face of the flange, or it may be made by bending separate pieces edgewise into semi-circular or segmental form and connecting their meeting ends by such bridge pieces riveted thereto, if desired.

What I claim and desire to secure by Letters Patent is:—

1. The herein described coupling for thick wall and high pressure plain end pipes, formed of wrought metal and comprising among its members a middle ring consisting of a central sleeve, separately formed end sleeves surrounding the end portions of the central sleeve and projecting beyond the same to form packing recesses, a filet engaging each end of the central sleeve and the inner face of the adjacent end sleeve and provided with a conical packing engaging face extending from the adjacent end of the central sleeve outwardly, and forming the inner end of the adjacent packing recess, packings in said packing recess having annular beveled portions to engage the conical face of said filets, clamping rings comprising annular flanges provided with bolt holes and annular portions adapted to engage the packing rings and clamping bolts.

2. The herein described coupling for plain end pipes, formed of wrought metal and comprising among its members a middle ring consisting of a central sleeve of greater internal diameter than the external diameter of the pipes to be connected and separately formed end sleeves surrounding and overlapping the end portions of the central sleeve said end sleeves being united to the central sleeve and projecting beyond the same to form packing recesses, the central sleeve being provided on its inner face with a centering stop consisting of a bar of a length equal to the internal circumference of the central sleeve and provided with oppositely beveled portions said bar being bent into circular form with the beveled portions on the exterior circumference thereof and filets engaging said beveled portions, and lying between them and the inner face of the sleeve and welded to the centering stop and sleeve, clamping rings comprising annular flanges provided with bolt apertures, and follower portions adapted to extend into the packing recesses, annular packings, and clamping bolts.

3. The herein described coupling for plain end pipes, comprising among its members a middle ring having end portions of enlarged diameter to form packing recesses, longitudinally disposed wedges having a width but a small fraction of the periphery of the pipe section adapted to be inserted at separated points around the pipe between the pipe ends and the central portion of the middle ring, packings in said recesses, clamping rings having annular flanges provided with bolt holes, and follower portions adapted to extend into said recesses, and clamping bolts.

4. The herein described coupling for plain end pipes, comprising among its members, a middle ring having the end portions of enlarged diameter to form packing recesses, and provided with abutting surfaces located at the inner ends of said packing recess and at the opposite ends of the central portion of the middle ring, a flat packing retaining ring having its external diameter less than the internal diameter of the enlarged end portions of the middle ring and disposed perpendicularly to the axis of the middle ring, located at the inner end of each packing recess and engaging one of said abutting surfaces for substantially closing the annular space between the central portion of the middle ring and the adjacent pipe end without engaging the outer wall of the packing recess, an annular packing ring in each of said recesses, clamping rings provided with annular flange portions having bolt holes therein, and annular follower portions, and clamping bolts.

5. The herein described coupling for plain end pipes comprising among its members a middle ring having end portions of enlarged diameter to form packing recesses, a packing ring in each of said recesses, packing retaining rings of different diameters engaging the exterior face of each packing ring, one of said retaining rings lying close to the pipe section, and the other lying close to the inner face of the enlarged portions of the middle ring, and in the same plane as the first mentioned retaining ring, clamping rings provided with annular flanged portions having bolt holes therein, and follower portions for engaging said retaining rings, and clamping bolts.

6. The herein described coupling for plain end pipes, comprising among its members a middle ring having end portions of enlarged diameter to form packing recesses, a packing retaining ring at the inner end of each of said packing recesses for closing the clearance between the middle ring and the pipe section, a packing ring in each of said recesses, packing retaining rings of different diameters engaging the exterior face of each packing ring, one of said retaining rings lying close to the pipe section, and the other lying close to the inner face of the enlarged portions of the middle ring, clamping rings provided with annular flanged portions having bolt holes therein, and follower portions for engaging said exterior packing retaining rings, and clamping bolts.

7. The herein described coupling for plain end pipes formed of wrought metal and comprising among its members a middle ring consisting of a central sleeve, separately formed end sleeves surrounding the end portions of the central sleeve and projecting beyond the same to form packing recesses, filets triangular in cross section engaging the ends of said central sleeve and the adjacent inner faces of the end sleeves, and welded thereto, and being provided with a conical packing engaging face, a packing retaining ring having its external diameter less than the diameter of the packing recess at the inner end of each of said packing recesses adapted to engage the end of the central sleeve and close the clearance between said sleeve and the adjacent pipe end, an annular packing ring in each packing recess, clamping rings having flanged portions provided with bolt holes, and follower portions for compressing the packing, and clamping bolts.

8. The herein described coupling for plain end pipes formed of wrought metal and comprising among its members a middle ring consisting of a central sleeve, separately formed end sleeves surrounding the end portions of the central sleeve and projecting beyond the same to form packing recesses, filets triangular in cross section engaging the ends of said central sleeve and the adjacent inner faces of the end sleeves, and welded thereto, a packing retaining ring at the inner end of each of said packing recesses adapted to engage the end of the central sleeve and close the clearance between said sleeve and the adjacent pipe end, an annular packing ring in each packing recess, packing retaining rings of different diameters lying in the same transverse plane and engaging the outer face of each packing within the packing recess, one of said rings lying close to the pipe section, and the other lying close to the inner face of the adjacent end sleeve of the middle ring, clamping rings provided with flanged portions having bolt holes therein, and follower portions for engaging said exterior packing retaining rings, and clamping bolts.

9. The herein described coupling for plain end pipes formed of wrought metal and comprising among its members a middle ring consisting of a central sleeve, end sleeves surrounding the end portions of the central sleeve, and projecting beyond the same to form packing recesses, annular filets triangular in cross section engaging the ends of the central sleeve and adjacent inner faces to the end sleeves, and welded thereto, a split ring at the inner end of each of said packing recesses engaging the inner end of the central sleeve, a packing ring in each of said recesses having an annular beveled face to engage said filet, packing retaining rings of different diameters lying in the same plane and engaging the outer faces of said packing rings, within said packing recesses, clamping rings comprising flanged portions provided with bolt holes, cylindrical follower portions, and annular filets engaging the exterior face of the follower portions, and the adjacent face of the flanged portion of each clamping ring, and welded thereto, and clamping bolts for connecting the flanged portions of said clamping rings.

10. In a coupling for plain end pipes, a wrought metal middle ring provided with packing recesses at its opposite ends, a separately formed centering stop consisting of a wrought metal bar having oppositely beveled portions adjacent to one edge, said bar being bent into a circle to fit the interior of the middle ring with the beveled portions adjacent to the inner face of said middle ring, fillets engaging said beveled portions and lying between them and the inner face of the middle ring and welded to the centering stop and middle ring, packings in said packing recesses, clamping rings and clamping bolts.

11. The herein described coupling for thick wall and high pressure plain end pipe, formed of wrought metal, and comprising among its members, a middle ring consisting of a central sleeve having an internal diameter sufficient to pass over and surround the meeting ends of the pipes to be connected, and two separately formed end sleeves having their inner diameters substantially equal to the exterior diameter of the central sleeve, surrounding and overlapping the opposite end portions of the central sleeve, and welded thereto, said end sleeves extending beyond the ends of the central sleeve and forming annular packing recesses terminating at their inner ends at the respective ends of said central sleeve, annular packing rings in said recesses, clamping rings provided with flanges having bolt apertures therein and follower portions adapted to surround the adjacent pipe sections and having their external diameters slightly less than the internal diameters of the end sleeves, so that said follower portions can extend into said annular packing recesses and compress the packings toward the opposite ends of the central ring and between the pipe sections and the inner faces of the end rings, and bolts for connecting said flanges.

In testimony whereof I affix my signature.

JAMES CLARK.